(12) United States Patent
Shibata

(10) Patent No.: US 10,047,553 B2
(45) Date of Patent: Aug. 14, 2018

(54) OPENABLE AND CLOSABLE MEMBER CONTROL APPARATUS AND OPENABLE AND CLOSABLE MEMBER CONTROL METHOD

(71) Applicant: ASMO CO., LTD., Kosai, Shizuoka-pref. (JP)

(72) Inventor: Kazuyuki Shibata, Kosai (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/046,476

(22) Filed: Feb. 18, 2016

(65) Prior Publication Data

US 2016/0251889 A1    Sep. 1, 2016

(30) Foreign Application Priority Data

Feb. 26, 2015  (JP) .................................. 2015-37120

(51) Int. Cl.

| | |
|---|---|
| *E05F 15/695* | (2015.01) |
| *E05F 15/60* | (2015.01) |
| *E05F 15/41* | (2015.01) |
| *H02P 3/08* | (2006.01) |
| *H02P 7/285* | (2016.01) |

(52) U.S. Cl.
CPC ............ *E05F 15/695* (2015.01); *E05F 15/41* (2015.01); *E05F 15/60* (2015.01); *H02P 3/08* (2013.01); *H02P 7/285* (2013.01)

(58) Field of Classification Search
USPC .......... 701/49; 318/434, 266, 283, 466, 467, 318/468, 469
See application file for complete search history.

(56) References Cited

U.S. PATENT DOCUMENTS

| | | | | |
|---|---|---|---|---|
| 5,453,669 A | * | 9/1995 | Nishibe ................ | H02H 7/0851 318/432 |
| 5,521,474 A | * | 5/1996 | Hahn ................... | H02H 7/0851 318/266 |
| 5,832,664 A | * | 11/1998 | Tajima .................... | E05F 15/41 318/434 |

(Continued)

FOREIGN PATENT DOCUMENTS

| | | |
|---|---|---|
| JP | 2003-003743 A | 1/2003 |
| JP | 2014-156767 A | 8/2014 |

*Primary Examiner* — Richard A Goldman
(74) *Attorney, Agent, or Firm* — Harness, Dickey & Pierce, P.L.C.

(57) ABSTRACT

A drive device drives a window glass of a door. A controller, which controls the drive device, executes a step of sensing an amount of load that is generated by contact between a seal member and the window glass after reaching of the window glass to a start position, at which a full closing control operation of the drive device starts. The controller executes a step of determining whether the amount of load reaches a predetermined value that is set to a value to be attained before reaching of the window glass to a mechanical limit position. The controller executes a step of stopping supply of an electric power to the drive device after it is determined that the amount of load reaches the predetermined value. The controller cancels the determining step or changes the predetermined value depending on the amount of voltage of the drive device.

8 Claims, 10 Drawing Sheets

(56) References Cited

U.S. PATENT DOCUMENTS

| | | | | |
|---|---|---|---|---|
| 6,034,495 A * | 3/2000 | Tamagawa | H02H 7/0851 | 318/266 |
| 6,150,784 A * | 11/2000 | Nagaoka | H02H 7/0851 | 318/467 |
| 6,274,947 B1 * | 8/2001 | Terashima | H02H 7/0851 | 307/10.1 |
| 6,548,980 B1 * | 4/2003 | Sakuma | E05F 15/40 | 318/264 |
| 6,580,241 B1 * | 6/2003 | Sugawara | H02H 7/0851 | 318/280 |
| 6,756,755 B2 * | 6/2004 | Kusunoki | E05F 15/695 | 318/280 |
| 7,073,291 B2 * | 7/2006 | Kawanobe | E05F 15/646 | 318/280 |
| 9,493,061 B2 * | 11/2016 | Goto | B60J 10/233 | |
| 2002/0149334 A1 * | 10/2002 | Nagaoka | H02H 7/0851 | 318/445 |
| 2004/0178758 A1 * | 9/2004 | Shinohara | E05F 15/41 | 318/469 |
| 2005/0067987 A1 * | 3/2005 | Nakazawa | H02H 7/0851 | 318/434 |
| 2006/0254148 A1 * | 11/2006 | Noro | E05F 15/695 | 49/352 |
| 2006/0293821 A1 * | 12/2006 | Takahashi | H02H 3/006 | 701/49 |
| 2007/0058303 A1 * | 3/2007 | Hirai | H02H 7/0852 | 361/23 |
| 2008/0100241 A1 * | 5/2008 | Takahashi | H02H 3/006 | 318/283 |
| 2009/0058340 A1 * | 3/2009 | Sakai | G05B 9/02 | 318/434 |
| 2009/0206784 A1 * | 8/2009 | Inoue | H02H 7/0851 | 318/434 |
| 2013/0106435 A1 * | 5/2013 | Mori | E05F 15/41 | 324/612 |
| 2014/0196252 A1 * | 7/2014 | Sakai | E05F 1/002 | 16/71 |
| 2016/0251889 A1 * | 9/2016 | Shibata | E05F 15/41 | |

* cited by examiner

OPENABLE AND CLOSABLE MEMBER CONTROL APPARATUS AND OPENABLE AND CLOSABLE MEMBER CONTROL METHOD

CROSS REFERENCE TO RELATED APPLICATION

This application is based on and incorporates herein by reference Japanese Patent Application No. 2015-37120 filed on Feb. 26, 2015.

TECHNICAL FIELD

The present disclosure relates to an openable and closable member control apparatus and an openable and closable member control method.

BACKGROUND

A previously proposed openable and closable member control apparatus, such as a lifting apparatus of a window glass of a door of a vehicle (e.g., an automobile), is constructed to move upward or downward the window glass by simply applying a drive voltage to an electric motor that generates a drive force to drive the window glass. Therefore, as shown in FIGS. 7A and 7B, at the time of driving the window glass 101 of the door 100 to its full closing position, the window glass 101 is driven until the window glass 101 urges a glass run channel 102 with an upper end (a tip end) of the window glass 101 and is mechanically locked by a stopper 104 of a window frame 103. Thus, at that time, an excessive collision force may be applied to the window glass 101, the window frame 103 and a drive system (not shown), and thereby, for example, a load applied to the drive system may be disadvantageously increased. Also, an annoying collision sound may be disadvantageously generated.

In order to address the above-described disadvantages, according to a prior art technique, supply of the electric power (supply of the electric voltage) is turned off to rotate the electric motor by inertial rotation and thereby to guide the openable and closable member to the full closing position or the full opening position thereof (see JP2003-3743A).

The technique of JP2003-3743A enables the openable and closable member to be reliably stopped at a target position without being influenced by a change in the operational state of the electric motor and without locking the electric motor.

However, the electric motor is rotated by the inertial force to drive the window glass to the full closing position by stopping the supply of the electric power to the electric motor immediately before reaching of the window glass to the full closing position. This operation is based on the assumption of that the window glass can be driven to the full closing position by the inertial rotation of the electric motor. Thereby, there is a disadvantage of that it is unknown whether the openable and closable member is actually moved to the full closing position.

Furthermore, in general, the openable and closable member, such as the window glass of the window, a roof panel of a sunroof or a slide door, may be driven in the closing direction and mechanically closed while being tilted due to, for example, looseness of a drive force transmission mechanism in a drive path. In such a case, the openable and closable member is driven while a plane of the openable and closable member is slightly tilted (turned) relative to the moving direction of the openable and closable member.

For example, in the exemplary case where the window glass of the window of the vehicle serves as the openable and closable member, as shown in FIGS. 8A to 8D, when the window glass 101, which is tilted due to the looseness, reaches a full closing state thereof, one (a part indicated with A-A line in FIG. 8A) of a left end part and a right end part of the window glass 101, which are respectively located on a left side or a right side in a turning direction (tilting direction) of the window glass 101 in FIG. 8A, first contacts a window glass side end part of a glass run channel 102, which is located at the window and serves as a mating member placed in the moving direction of the window glass 101 (see FIG. 8B).

When the window glass (the openable and closable member) 101 stops in the state where the one of the left end part and the right end part of the window glass 101 first contacts the end part of the mating member placed in the moving direction, a small gap 105 is generated between the window glass 101 and the glass run channel 102 in a state where the window glass 101 is not completely closed at the other one (a part indicated with B-B line in FIG. 8A) of the left end part and the right end part of the window glass 101, as shown in FIG. 8C. Thus, the sealing between the window glass 101 and the glass run channel 102 is deteriorated, and thereby, for example, water may enter a passenger compartment of the vehicle at the time of, for example, washing the vehicle, or a wind noise may be generated at the time of running the vehicle.

Furthermore, for example, as shown in FIG. 8B, the window glass 101 is sealed by the glass run channel 102 placed at the upper side portion of the window frame 103. The glass run channel 102 has a bottom portion 102a, two side portions 102c, an inner seal lip portion $102d_1$ and an outer seal lip portion $102d_2$. The side portions 102c extend from the bottom portion 102a while a groove (space) 102b is interposed between the side portions 102c. The inner seal lip portion $102d_1$ is bent and is urged inwardly from one of the side portions 102c into the groove (space) 102b.

The outer seal lip portion $102d_2$ is bent and is urged inwardly from the other one of the side portions 102c into the groove (space) 102b. The window glass 101 is held between the inner seal lip portion $102d_1$ and the outer seal lip portion $102d_2$ from the vehicle left side and the vehicle right side (widthwise direction of the vehicle). In the state where the window glass 101 contacts the glass run channel 102 (the mating member), when the window glass 101 is further driven upward toward the upper end side (closing side), a lower portion of the window glass 101 is moved outward (a right outer side pointed with an arrow in FIG. 8D) in the widthwise direction of the vehicle by a component drive force of the window glass 101. Thus, a gap between an inner seal lip portion 106a of a belt molding 106 and the window glass 101 is increased, and thereby a sealing force of the inner seal lip portion 106a is reduced. Also, an outer seal lip portion 106b of the belt molding 106 is urged by the window glass 101 and is thereby deformed. As a result, as shown in FIG. 8D, a positional relationship between the belt molding 106 and the window glass 101 is deviated from a normal positional relationship (a pre-designed position of the window glass 101 relative to the belt molding 106). Thereby, a portion of the belt molding 106, which is placed at the lower side of the window frame 103, is deformed due to the deformation of the outer seal lip portion 106b. As a result, a gap is generated between the belt molding 106 and the window glass 101 to cause generation of the wind noise at the time of running the vehicle.

Therefore, it is desirable that both of the left end part and the right end part (the upper end part and the lower end part) of the openable and closable member can tightly contact the mating member to avoid application of an excess load to the drive system. Also, it is desirable that the seal member (e.g., the glass run channel or the belt molding), which seals the openable and closable member, is not influenced by the openable and closable member.

The mating member (e.g., the glass run channel), which contacts the window glass (the openable and closable member) to place the window glass into the full closing state, is made of a resilient material (e.g., rubber material). Therefore, in the case where the electric motor is controlled to stop when one of the left end part and the right end part of the window glass first contacts the mating member (e.g., the glass run channel), as shown in FIG. 8C, the gap may possibly be generated between the window glass and the mating member due to the influence of the orientation of the window glass at the time of upwardly moving the window glass. Furthermore, in the case where the window glass is stopped in the state where the glass run channel only contacts the upper end part of the window glass, the water may possibly enter the passenger compartment of the vehicle through a gap between the glass run channel and the upper end part of the window glass at the time of washing the vehicle with a high pressure washing machine.

Furthermore, in the case of the window of the door, at the time of placing the window glass (the openable and closable member) into the full closing state, the window glass may possibly deform the belt molding, which is placed at the lower frame portion of the window frame 103, to possibly cause generation of the wind noise at the time of running the vehicle. That is, when the openable and closable member is placed into the fully closing state to fully close the open space of the window, the openable and closable member may possibly cause the deformation of the member, which seals the base side of the open space. This deformation may possibly cause an unstable flow of the wind at the time of running the vehicle to cause generation of the wind noise.

In order to address the above disadvantages, another technique has been proposed (see, for example, JP2014-156767A that corresponds to US2014/0196252A1). According to this technique, a rotational speed (a rotation period) of an electric motor is computed. When the amount of change in the rotational speed of the electric motor exceeds a threshold value, the supply of the electric power to the electric motor is stopped.

The technique of JP2014-156767A (corresponding to US2014/0196252A1) can prevent occurrence of erroneous stop of the openable and closable member in the middle of the opening. Also, according to this technique, a load, which is generated in a state where an opposing portion of the openable and closable member and an opposing portion of the resilient member are entirely urged against each other, is sensed. The supply of the electric power to the electric motor is controlled based on the sensed load, so that the electric motor can be stopped in the state where the opposing portion of the openable and closable member and the opposing portion of the resilient member are entirely urged against each other. Thereby, the required sealing performance of the openable and closable member can be ensured.

However, in a state where the voltage of the electric motor is low, when the above-described control technique is applied to compute the rotational speed (the rotation period) of the electric motor and to stop the supply of the electric power to the electric motor at the time when the amount of change in the rotational speed of the electric motor exceeds the threshold value, the window glass may possibly be stopped without fully closing the opening of the window with the window glass. Therefore, depending on a value of the voltage of the electric motor, the required sealing performance may not be achieved with the window glass.

Thus, there is a demand for a technique that can fully close the window glass even in the low voltage condition where the closing force (drive force) of the electric motor, which drives the window glass to fully close the window glass, is low, thereby limiting deterioration of the sealing performance of the window glass.

SUMMARY

The present disclosure is made in view of the above point.

According to the present disclosure, there is provided an openable and closable member control apparatus, which includes a drive device and a controller. The drive device drives an openable and closable member to open or close an opening of a subject with the openable and closable member. The controller controls the drive device and is configured to execute: a position determining step of determining whether the openable and closable member reaches a start position, at which the controller starts a full closing control operation of the drive device to place the openable and closable member into a full closing state; a voltage sensing step of sensing an amount of voltage of the drive device; a load change sensing step of sensing an amount of load that is generated by contact between a seal member of the opening and the openable and closable member after reaching of the openable and closable member to the start position; a load attainment determining step of determining whether the amount of load reaches a predetermined value that is set to a value to be attained before reaching of the openable and closable member to a mechanical limit position; and an electric power supply stopping step of stopping supply of an electric power to the drive device after it is determined that the amount of load reaches the predetermined value in the load attainment determining step, wherein the controller cancels the load attainment determining step or changes the predetermined value depending on the amount of voltage, which is sensed at the voltage sensing step.

According to the present disclosure, there is also provided an openable and closable member control method for controlling a drive device, which drives an openable and closable member to open or close an opening of a subject with the openable and closable member. The openable and closable member control method includes: a position determining step of determining whether the openable and closable member reaches a start position, at which a full closing control operation of the drive device is started to place the openable and closable member into a full closing state; a voltage sensing step of sensing an amount of voltage of the drive device; a load change sensing step of sensing an amount of load that is generated by contact between a seal member of the opening and the openable and closable member after reaching of the openable and closable member to the start position; a load attainment determining step of determining whether the amount of load reaches a predetermined value that is set to a value to be attained before reaching of the openable and closable member to a mechanical limit position; an electric power supply stopping step of stopping supply of an electric power to the drive device after it is determined that the amount of load reaches the predetermined value in the load attainment determining step; and a step of cancelling the load attainment determining step or changing the predetermined value depending on the amount of voltage, which is sensed at the voltage sensing step.

BRIEF DESCRIPTION OF THE DRAWINGS

The drawings described herein are for illustration purposes only and are not intended to limit the scope of the present disclosure in any way.

DETAILED DESCRIPTION

An embodiment of the present disclosure will be described with reference to the accompanying drawings.

Figure 1:
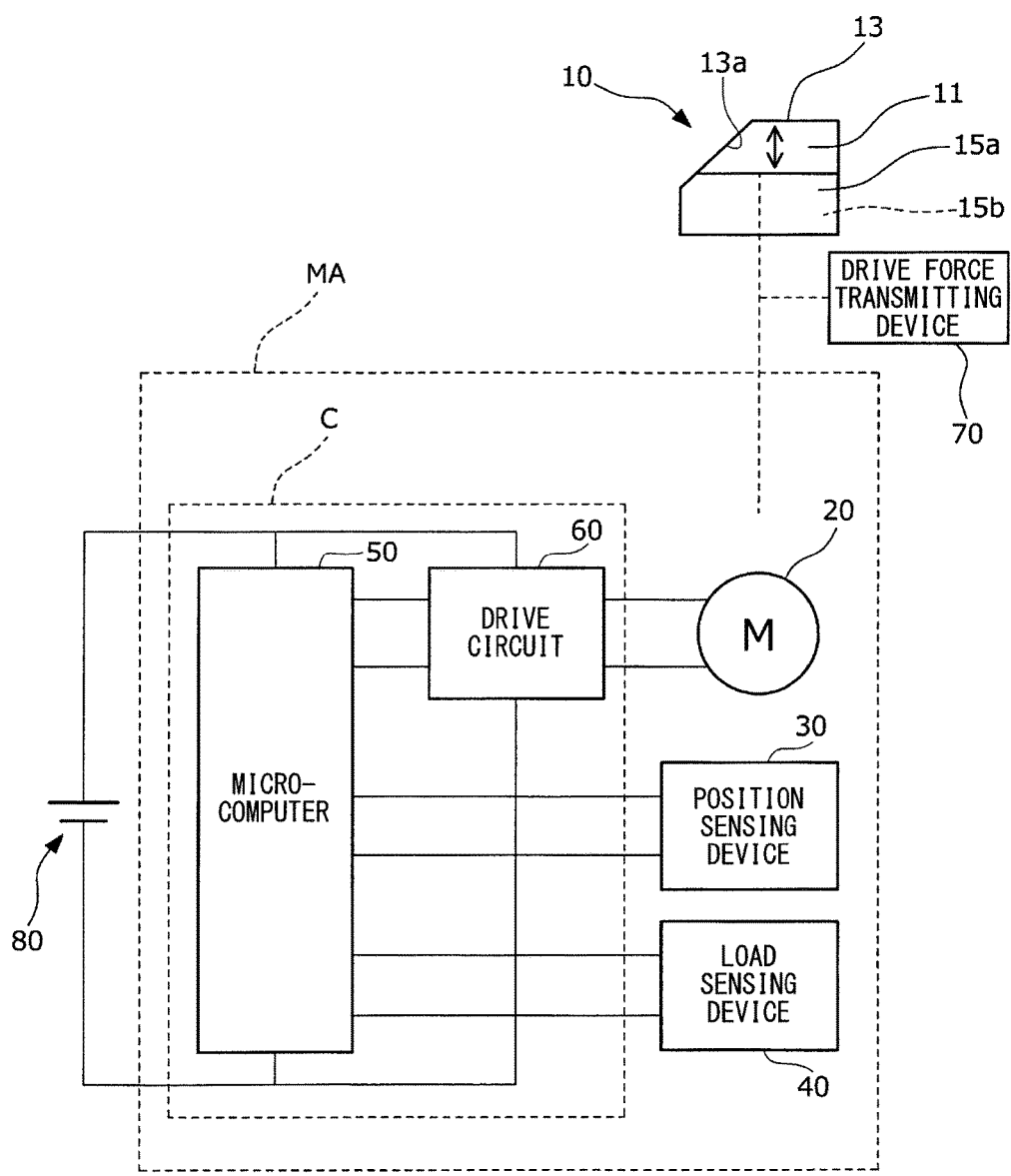
FIG. 1 is a block diagram for describing an electrical construction of an openable and closable member control apparatus according to an embodiment of the present disclosure.
Figure 2:
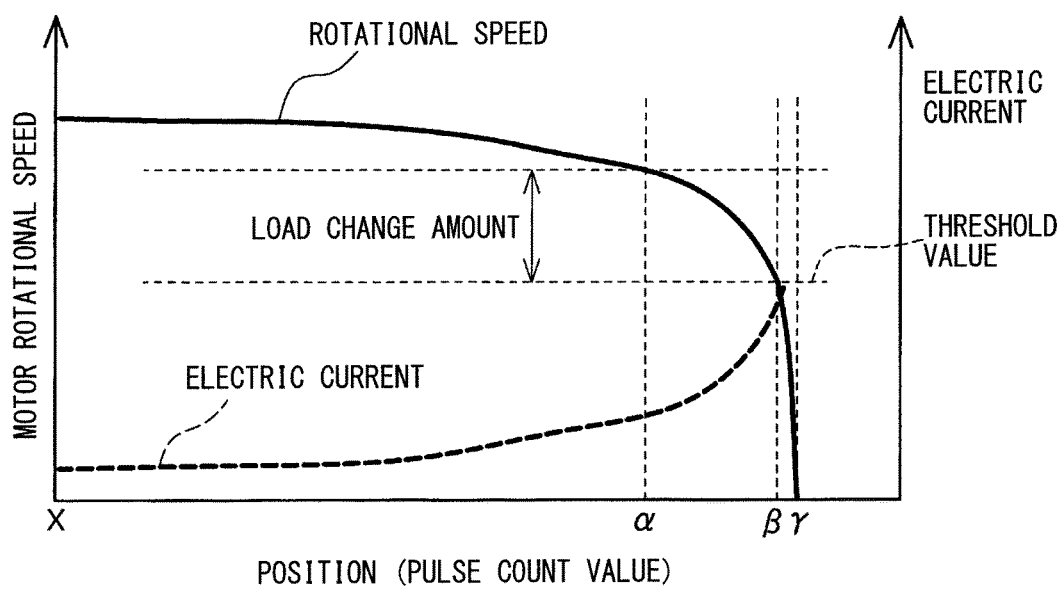
FIG. 2 is a diagram showing a relationship between a rotational speed of an electric motor and a current of the electric motor according to the embodiment.
Figure 3A:
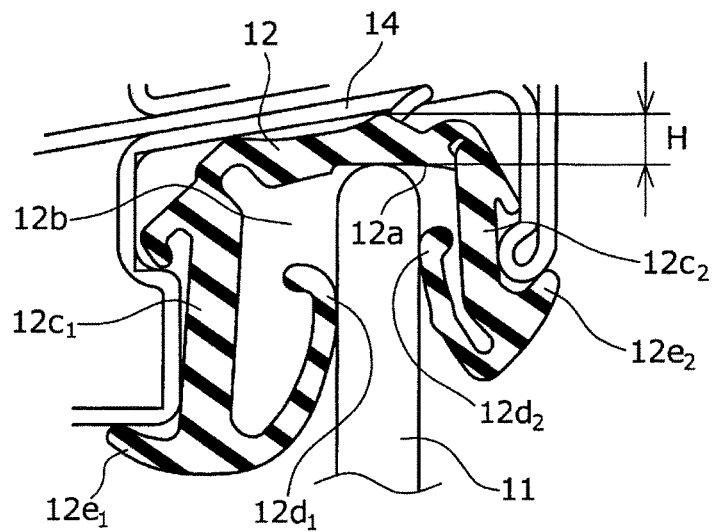
FIG. 3A is a schematic diagram indicating a relationship between an upper end portion of a window glass and a glass run channel at a point α in FIG. 2 according to the embodiment.
Figure 3B:
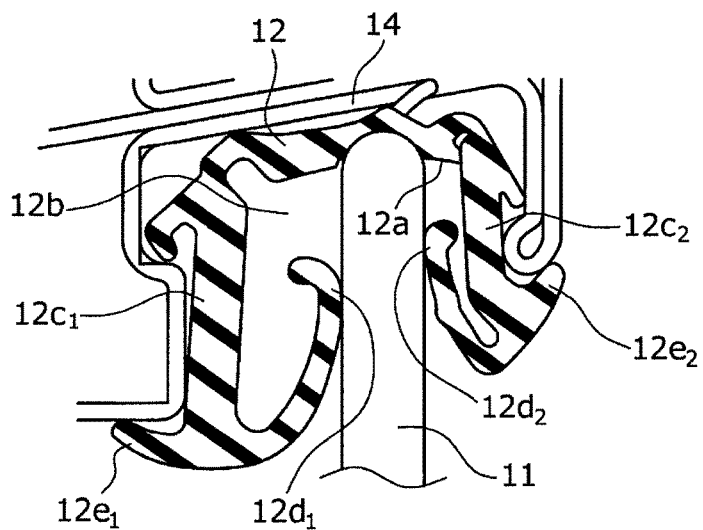
FIG. 3B is a schematic diagram indicating a relationship between the upper end portion of the window glass and the glass run channel at a point β in FIG. 2 according to the embodiment.
Figure 3C:
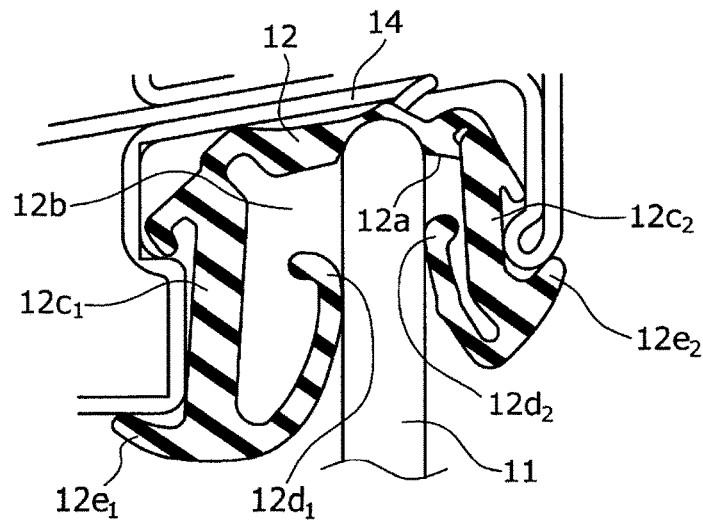
FIG. 3C is a schematic diagram indicating a relationship between the upper end portion of the window glass and the glass run channel at a point γ in FIG. 2 according to the embodiment.
Figure 4A:
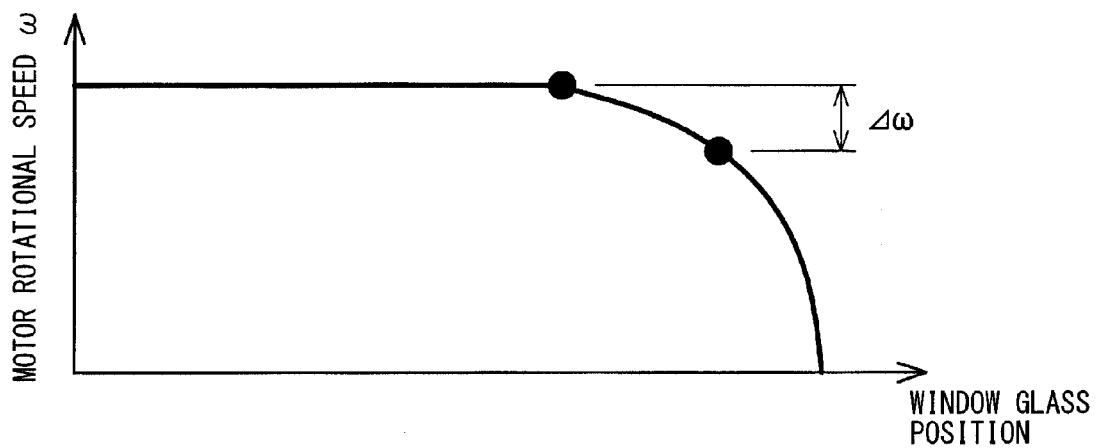
FIG. 4A is a schematic diagram indicating a relationship between the rotational speed of the electric motor and a window glass position according to the embodiment.
Figure 4B:
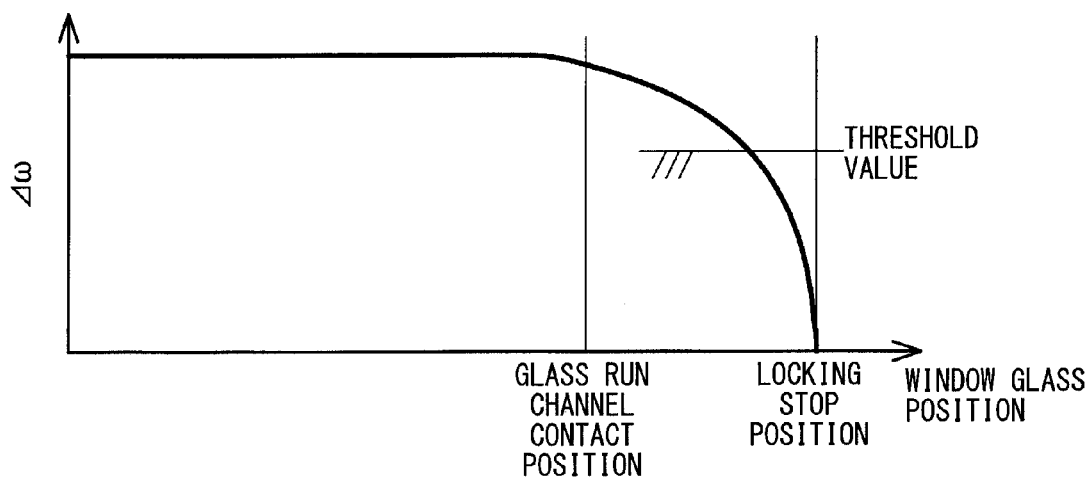
FIG. 4B is a partial enlarged view of FIG. 4A.
Figure 5:
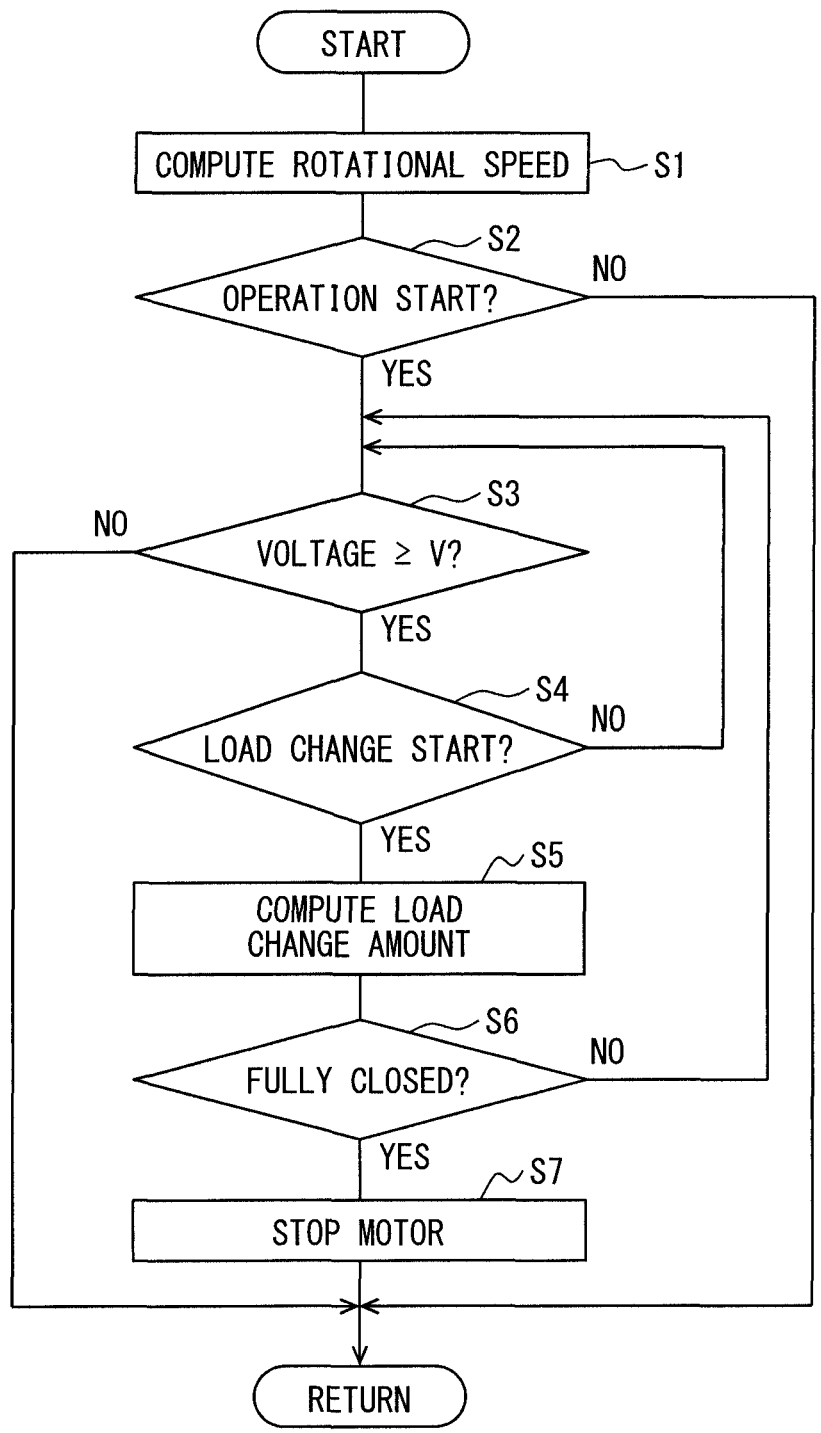
FIG. 5 is a flowchart indicating a control operation according to the embodiment.
Figure 6:
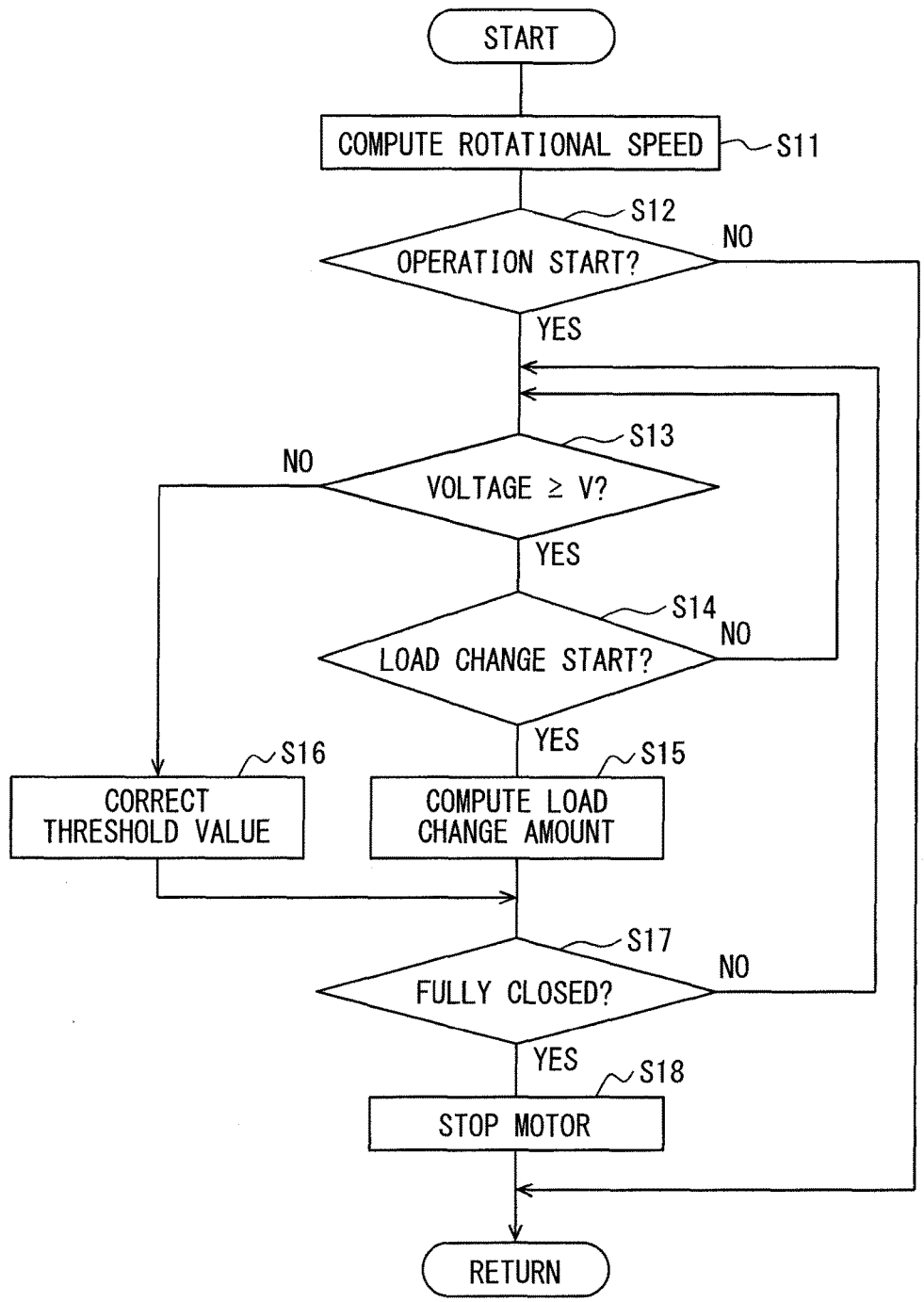
FIG. 6 is a flowchart indicating another control operation according to the embodiment.

FIGS. 1 to 6 show the present embodiment. Specifically, FIG. 1 is a block diagram for describing an electrical construction of an openable and closable member control apparatus according to an embodiment of the present disclosure. FIG. 2 is a diagram showing a relationship between a rotational speed of an electric motor and a current of the electric motor according to the embodiment. FIG. 3A is a schematic diagram indicating a relationship between an end portion of an openable and closable member and a mating member at a point α in FIG. 2 according to the embodiment. FIG. 3B is a schematic diagram indicating a relationship between the end portion of the openable and closable member and the mating member at a point β in FIG. 2 according to the embodiment. FIG. 3C is a schematic diagram indicating a relationship between the end portion of the openable and closable member and the mating member at a point γ in FIG. 2 according to the embodiment. FIG. 4A is a schematic diagram indicating a relationship between the rotational speed of the electric motor and a window position according to the embodiment. FIG. 4B is a partial enlarged view of FIG. 4A. FIG. 5 is a flowchart indicating a control operation according to the embodiment. FIG. 6 is a flowchart indicating another control operation according to the embodiment.

With reference to FIG. 1, the openable and closable member control apparatus S of the present embodiment includes a motor assembly MA, a controller C, a drive motor (electric motor) 20, a position sensing device (a positing sensing means) 30, a load sensing device (a load sensing means) 40, a microcomputer 50, and a drive circuit 60 (the drive circuit 60 may possibly include the microcomputer 50). The controller C, which may include the microcomputer 50 and the drive circuit 60, is integrated into the motor assembly MA or is connected to the motor assembly MA. The drive motor 20 may be a part of a drive device that drives a window glass (serving as an openable and closable member) 11, which is installed to a door (subject) 10 of a vehicle (e.g., an automobile), to open or close a window (opening) 13a of a window frame 13 of the door 10 with the window glass 11. The microcomputer 50 controls the operation of the drive motor 20 and executes processing of various sensed signals and various computing operations. The microcomputer 50 serves as a load change sensing device (a load change sensing means) and a stop commanding device (a stop commanding means). The drive circuit 60 serves as a drive force stopping device. When a switch (a down-switch, an up-switch, and an automatic switch, which are not depicted in the drawings) of the power window apparatus for generating an operational command is manipulated by an occupant of the vehicle, the drive motor 20, which is the part of the drive device (drive means), drives the window glass 11 upward or downward (for closing or opening of the winding glass 11) through a drive force transmitting device (a drive force transmitting means) 70.

Figure 7A:
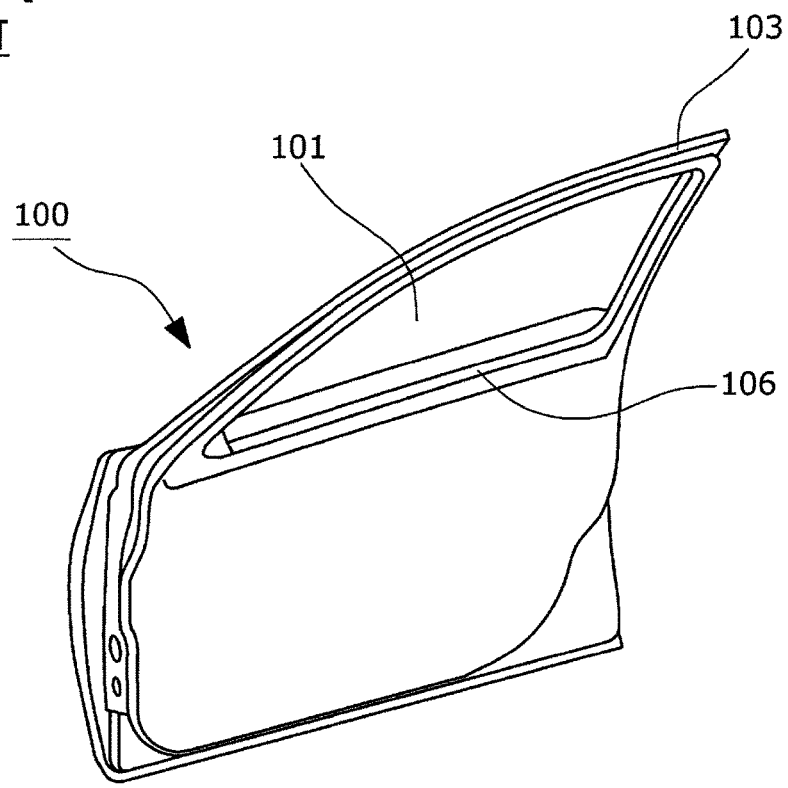
FIGS. 7A and 7B are schematic diagrams showing a prior art technique.
Figure 7B:
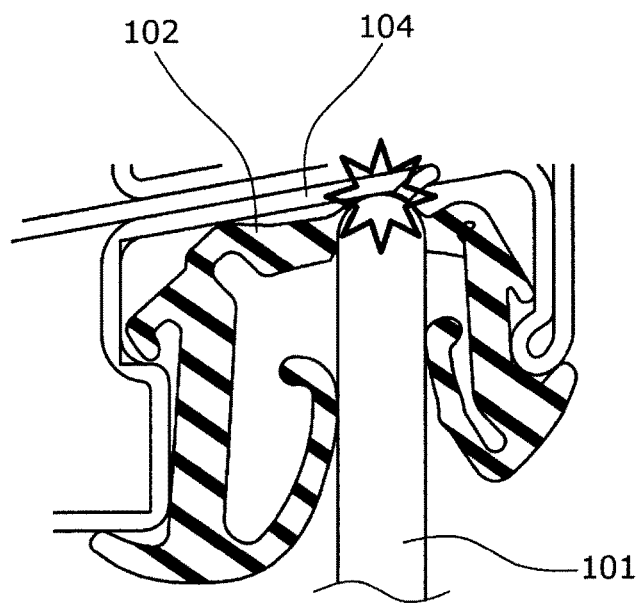

The door 10 of the present embodiment is similar to the door 100 of FIG. 7A. Specifically, the door 10 includes a receiving space (a space defined in a widthwise direction of the door 10) that is located at a lower side of the door 10 and is formed between an outer panel 15a, which is located at an outer side of the vehicle (an outer side in the widthwise direction of the vehicle), and an inner panel 15b, which is located at an inner side, i.e., a passenger compartment side of the vehicle (an inner side in the widthwise direction of the vehicle), to receive the window glass 11 that is moved downward.

Figure 8A:
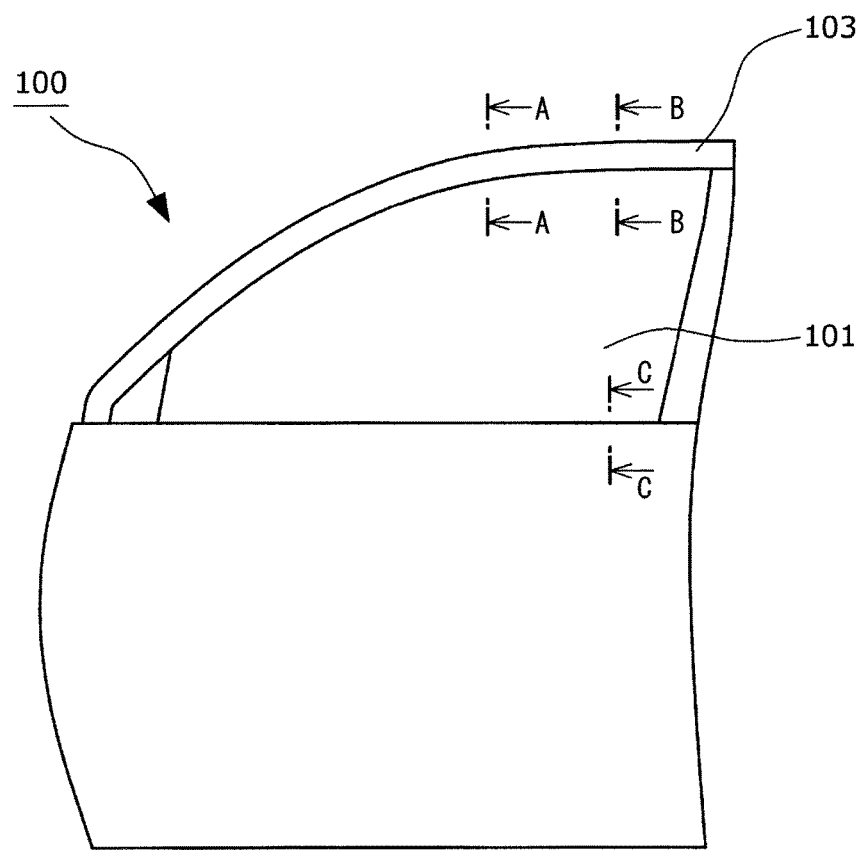
FIG. 8A is a schematic diagram showing a window of a door of a vehicle according to the prior art technique.
Figure 8B:
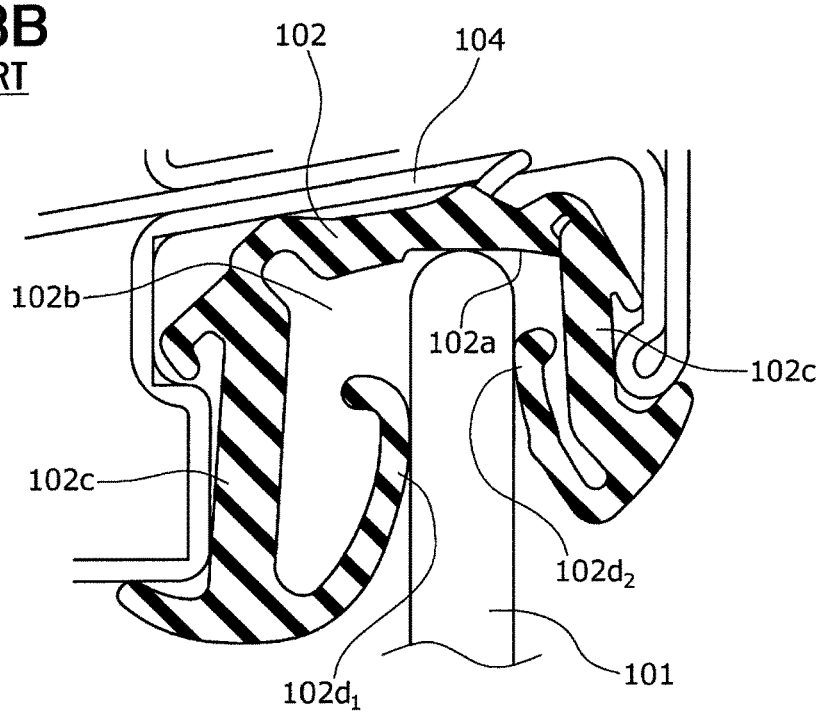
FIG. 8B is a partial enlarged cross-sectional view taken at line A-A in FIG. 8A.
Figure 8C:
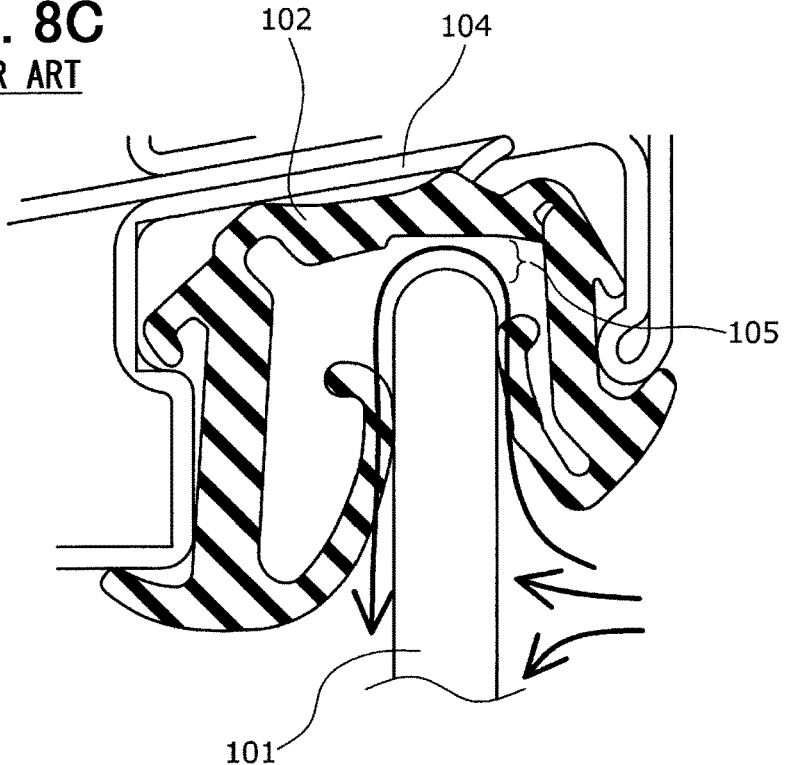
FIG. 8C is a partial enlarged cross-sectional view taken at line B-B in FIG. 8A.
Figure 8D:
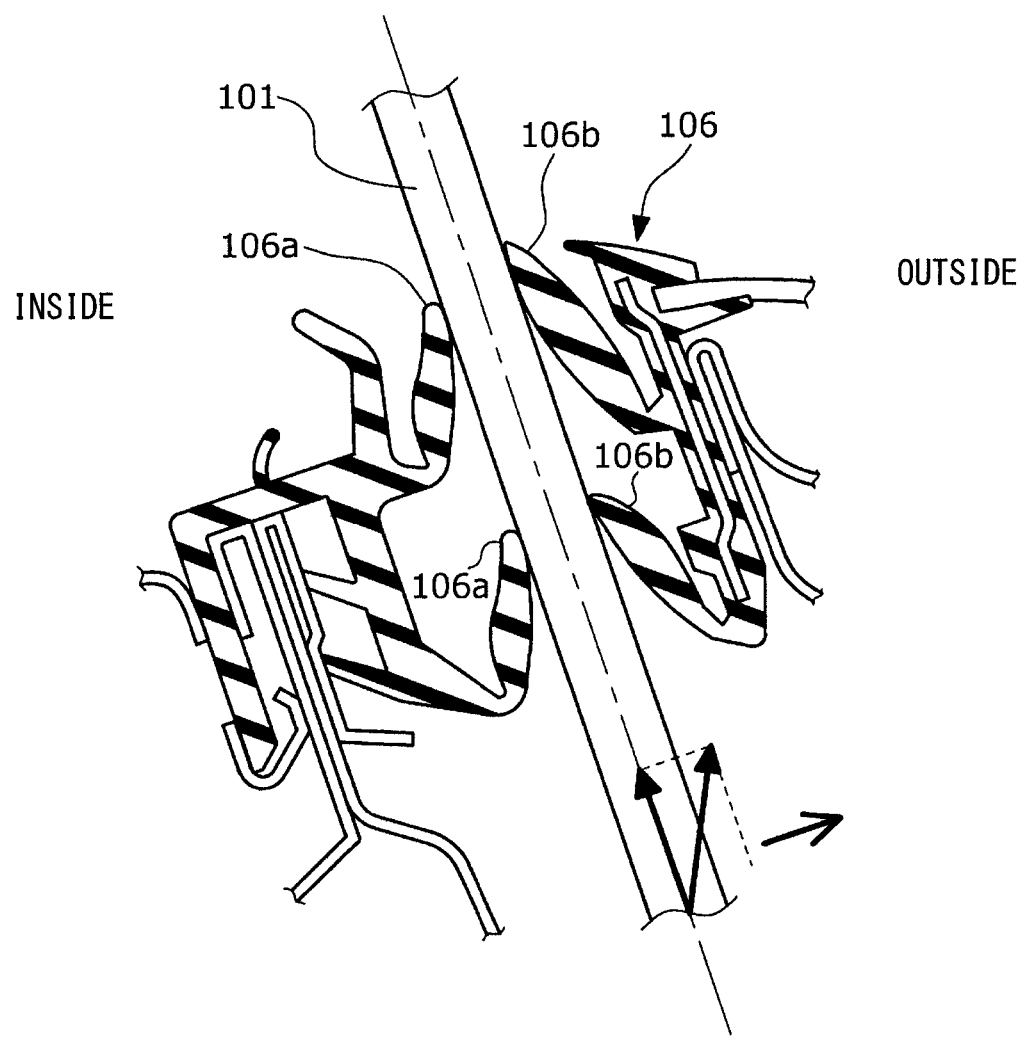
FIG. 8D is a partial enlarged cross-sectional view taken at line C-C in FIG. 8A.

A window frame (glass frame) 13 is formed at an upper side of the door 10. The window glass 11 emerges from the receiving space into the window frame 13 beyond the lower frame portion of the window frame 13 such that the window glass 11 is movable upward or downward along the window frame 13. A belt molding (similar to the belt molding 106 of FIG. 8D), which wipes water droplets adhered to the window glass 11, is placed at the lower frame portion of the window frame 13. A stopper 14 is formed at a lower side of an upper frame portion of the window frame 13. A glass run channel 12, which is a seal member (serving as a mating member), is installed to the stopper 14.

The glass run channel 12 of the present embodiment is made of a resilient material (e.g., a rubber member). As shown in FIGS. 3A to 3C, the glass run channel 12 has a groove (a space) 12b, which opens toward the lower side of the door 10. Specifically, the glass run channel 12 includes a bottom portion 12a, an inner side portion $12c_1$, an outer side portion $12c_2$, an inner seal lip portion $12d_1$ and an outer seal lip portion $12d_2$, which are formed integrally as a one-piece body. The inner side portion $12c_1$ and the outer side portion $12c_2$ extend from the bottom portion $12a$ such that the groove (space) $12b$ is interposed between the inner side portion $12c_1$ and the outer side portion $12c_2$. The inner seal lip portion $12d_1$ is bent and is urged inwardly from the inner side portion $12c_1$ into the groove (space) $12b$. The outer seal lip portion $12d_2$ is bent and is urged inwardly from the outer side portion $12c_2$ into the groove (space) $12b$.

The window glass 11 is resiliently held by the inner seal lip portion $12d_1$ and the outer seal lip portion $12d_2$ of the glass run channel 12 from two opposite sides, which are opposite to each other in the widthwise direction of the vehicle. Numeral $12e_1$ indicates an extension that extends from the inner side portion $12c_1$ to engage with the window frame 13, and numeral $12e_2$ indicates an extension that extends from the outer side portion $12c_2$ to engage with the window frame 13.

The drive motor 20 of the present embodiment receives the electric power from a battery 80 through the controller C (the microcomputer 50 and the drive circuit 60), which will be described later, to energize windings of a rotor of the drive motor 20, so that a rotational force is generated between the rotor and a stator having permanent magnets. The rotor is rotatable in a normal rotational direction and a reverse rotational direction, which are opposite to each other, by changing a flow direction of the electric current in the windings.

In the present embodiment, the drive force transmitting device 70, which transmits the drive force from the drive motor 20 to the window glass 11, may be constructed as follows. That is, when the drive motor 20 is rotated, a lifting arm and a driven-side arm are swung while slide movements of end portions of the lifting arm and of the driven-side arm are limited by corresponding channels, so that the lifting arm and the driven-side arm are driven as an X-linkage to upwardly or downwardly move the window glass 11. Alternatively, the drive force transmitting device may be constructed as follows. Specifically, an opening side end portion of the window glass 11 is held by a bracket that is movable in an opening direction and a closing direction of the window glass 11 along a guide rail that extends in the opening direction and the closing direction of the window glass 11, and a wire, which is fixed to the bracket, is driven by the drive motor 20 to upwardly or downwardly move the window glass 11.

In both of the above cases, the lower portion of the window glass 11 is coupled to the drive force transmitting device 70. The window glass 11 is pushed or pulled at the lower portion of the window glass 11 through the drive force transmitting device 70 to drive the window glass 11 (see the door 10 of FIG. 1).

The drive motor 20 of the present embodiment includes the position sensing device (the position sensing means) 30 and the load sensing device (the rotation sensing device) 40. The position sensing device 30 senses whether the window glass 11 reaches a predetermined position in a determining process of determining whether it is the time to start a full closing control operation (described later). Then, it is determined whether it is the time to start the full closing control operation based on the result of this determination of whether the window glass 11 reaches the predetermined position.

The load sensing device 40 outputs a pulse signal (a load amount sensing signal), which is synchronized with the rotation of the drive motor 20. The load sensing device 40 of the present embodiment includes, for example, a Hall IC having two Hall elements and senses a change in a magnetic field (a magnetism) of a magnet, which is rotated integrally with an output shaft of the drive motor 20 with the Hall IC (Hall elements).

The load sensing device 40, which is constructed in the above-described manner, outputs the pulse signal, which is synchronized with the rotation of the drive motor 20. Specifically, the pulse signal is outputted every time the window glass 11 is moved for a predetermined moving amount (distance) or every time the drive motor 20 is rotated for a predetermined rotational angle. In this way, the load sensing device 40 can output the signal that corresponds to the movement of the window glass 11, which is generally proportional to the rotational speed of the drive motor 20. The microcomputer 50 of the controller C counts the number of the pulse edges of the pulse signal outputted from the load sensing device 40, and thereby the microcomputer 50 senses the position of the window glass 11 and the rotational speed of the drive motor 20 based on the pulse count value. In the present embodiment, the load sensing device 40 and the microcomputer 50 form the load change sensing device.

In the present embodiment, the load sensing device (the rotation sensing device) 40 uses the Hall IC (more specifically, the Hall elements). However, the load sensing device of the present disclosure is not limited to this type. That is, for example, any type of encoder may be used as the load sensing device as long as the encoder can sense the rotation of the drive motor 20. Furthermore, a ripple current, which is generated at the time of changing the energization of the windings, may be sensed at the time of energizing the drive motor, and the rotational speed of the drive motor and the rotational position of the output shaft of the drive motor (the position of the openable and closable member) may be sensed through sensing of a waveform of the ripple current.

The microcomputer 50 of the present embodiment includes a CPU, memories (e.g., a ROM, a RAM), an input circuit and an output circuit. The CPU is interconnected with the memory, the input circuit and the output circuit through a bus line. The microcomputer 50 is connected to an electronic control unit (ECU) 7 at the vehicle body side through, for example, a wire (e.g., a harness) or a wireless communication. The microcomputer 50 may be formed by a digital signal processor (DSP) or a gate array.

The microcomputer 50 of the present embodiment has the function of executing the computation upon receiving the signal from the position sensing device 30 and determining whether it is the time to start the full closing control operation. The microcomputer 50 also has the function (the function of the load change sensing device also referred to as the load change sensing means) of sensing a change in the amount of load (also referred to as the load amount) applied to the drive motor 20 through the computation upon receiving the signal from the load sensing device 40. The microcomputer 50 also has the function of determining whether a change in the amount of load (specifically, a change in the amount of load, which is applied to the drive motor 20 through the window glass 11 upon occurrence of the contact between the window glass 11 and the glass run channel 12) is started in the case where it is determined that the amount of load reaches the predetermined load value. The microcomputer 50 also has the function (the function of the stop commanding device also referred to as the stop commanding means) of stopping the window glass 11 (the openable and closable member) within a load change amount sensing range (a sensing range for sensing the amount of change in the load) immediately before a mechanical moving limit position after starting of the change in the amount of load.

The microcomputer 50 further has the function of outputting the signal of the stop commanding device to the drive circuit 60 to stop the supply of the electric power to the drive motor 20 and thereby to stop the movement of the window glass 11. The required electric power is supplied from the battery 80, which is installed in the vehicle, to the microcomputer 50 and the drive circuit 60 of the controller C and the drive motor 20.

The microcomputer 50 drives the drive motor 20 in the normal rotational direction or the reverse rotational direction through the drive circuit 60 based on the signal outputted from the switch (the down-switch, the up-switch, and the automatic switch) to open or close the window glass 11 during the normal operation of the power window apparatus.

Furthermore, the microcomputer 50 may possibly be constructed to execute a computation based on a reference position of the full opening (or full closing) of the winding glass 11 and the pulse signal received from the load sensing device (the rotation sensing device) 40 to sense the position of the window glass 11 and adjust the amount of drive electric power to be supplied to the drive motor 20 through the drive circuit 60 based on the sensed position of the window glass 11. In such a case, the position sensing device 30 may also function as the load sensing device 40.

The microcomputer 50 senses a leading edge and/or a trailing edge (pulse edges) of the received pulse signals and computes the rotational speed (the rotation period) of the drive motor 20 based on an interval (period) of these pulse edges, and the microcomputer 50 senses a rotational direction of the drive motor 20 based on a phase difference between the pulse signals respectively outputted from the Hall elements of the Hall IC. That is, the microcomputer 50 indirectly computes the moving speed of the window glass 11 based on the rotational speed (the rotation period) of the drive motor 20 and determines the moving direction of the window glass 11 based on the rotational direction of the drive motor 20. Furthermore, the microcomputer 50 counts the number of the pulse edges, and this pulse count value, which is counted by the microcomputer 50, is incremented or decremented in response to the opening movement or closing movement of the window glass 11. The microcomputer 50 determines the operational position (the opening/closing position) of the window glass 11 based on the pulse count value.

That is, in the present embodiment, the window glass 11 cab be driven while the full closing position of the window glass 11 is used as the reference position. In the case where the full closing position of the window glass 11 is used as the reference position, the pulse count value is set to be zero (0) at the full closing position of the window glass 11. Once the pulse count value is set to be zero (0) at the reference position, the pulse count value is incremented by 1 every time the pulse signal is received at the time of moving the window glass 11 toward one end of the operational range (moving range) of the window glass 11, such as the full opening position of the window glass 11. In contrast, the pulse count value is decremented by 1 every time the pulse signal is received at the time of moving the window glass 11 toward the other end of the operational range (moving range) of the window glass 11, such as the full closing position.

Alternatively, the window glass 11 may be driven while the full opening position is used as the reference position. In such a case, the pulse count value is set to be zero (0) at the full opening position of the window glass 11. Furthermore, the pulse count value is incremented by 1 every time the pulse signal is received at the time of moving the window glass 11 toward the full closing position of the window glass 11. In contrast, the pulse count value is decremented by 1 every time the pulse signal is received at the time of moving the window glass 11 toward the full opening position.

Furthermore, in the present embodiment, the occurrence of the change in the amount of load of the window glass 11 as well as the amount of load of the window glass 11 are monitored based on the change in the rotational speed of the drive motor 20, which relates to the moving speed of the window glass 11. Alternatively, the occurrence of the change in the amount of load of the window glass 11 as well as the amount of load of the window glass 11 may possibly be sensed by monitoring a change in the amount (a current value) of electric current, which flows through the drive motor 20 during the operation of the drive motor 20. In such a case, when the amount (current value) of electric current, which flows through the drive motor 20, is increased beyond a predetermined value, the signal of the stop commanding device (the stop commanding means) may be outputted to the drive circuit 60 to stop the supply of the electric power to the drive motor 20 and thereby to stop the movement of the window glass 11.

In the above-described case where the amount (current value) of electric current is used, the microcomputer 50 senses the leading edge and/or the trailing edge of the electric current based on the amount (current value) of electric current and senses the amount of load of the drive motor 20 (the amount of load of the electric current of the drive motor 20). Also, the microcomputer 50 senses the rotational direction of the drive motor 20 based on the flow direction of the electric current. That is, the microcomputer 50 indirectly computes the moving speed of the window glass 11 based on the amount (current value) of electric current supplied to the drive motor 20 and determines the moving direction of the window glass 11 based on the rotational direction of the drive motor 20.

The drive circuit 60 of the present embodiment includes an integrated circuit (IC), which includes field-effect transistors (FETs). The drive circuit 60 changes a polarity of the electric power to be supplied to the drive motor 20 based on the input signal received from the microcomputer 50. Specifically, when the drive circuit 60 receives a normal rotation command signal (a signal for commanding the normal rotation of the drive motor 20) from the microcomputer 50, the drive circuit 60 supplies the electric power to the drive motor 20 such that the drive motor 20 is rotated in the normal rotational direction. In contrast, when the drive circuit 60 receives a reverse rotation command signal (a signal for commanding the reverse rotation of the drive motor 20) from the microcomputer 50, the drive circuit 60 supplies the electric power to the drive motor 20 such that the drive motor 20 is rotated in the reverse rotational direction. Furthermore, when the drive circuit 60 receives the signal of the stop commanding device (stop commanding means) from the microcomputer 50, the drive circuit 60 stops the supply of the electric power to the drive motor 20. Here, it should be noted that the drive circuit 60 may possibly include a relay circuit to change the polarity of the electric power. Also, the drive circuit 60 may possibly be integrated into the microcomputer 50.

FIG. 2 shows the graph that indicates a relationship between the rotational speed of the drive motor 20 and the amount of electric current supplied to the drive motor 20. The graph of FIG. 2 indicates the waveform at the time of decreasing the rotational speed of the drive motor 20 in the closing operation of the window glass 11. FIG. 3A indicates the relationship between the upper end portion of the window glass (the openable and closable member) 11 and the glass run channel (the mating member) 12 at the point α in FIG. 2. FIG. 3B indicates the relationship between the upper end portion of the window glass (the openable and closable member) 11 and the glass run channel (the mating member) 12 at the point β in FIG. 2. Specifically, the rotational speed of the drive motor 20 is decreased beyond a threshold value at the point β in FIG. 2, and thereby the supply of the electric power to the drive motor 20 is stopped at the point β. At this time, as shown in FIG. 3B, the upper end portion (tip end portion) of the window glass 11 contacts the glass run channel 12, so that the movement of the window glass 11 is immediately stopped. Thereby, the window glass 11 is placed in the state shown in FIG. 3C (i.e., the point γ in FIG. 2). At this time, there is no substantial positional change of the window glass 11 between the point β and the point γ in FIG. 2.

Here, it should be noted that the rotational speed of the drive motor 20 is not necessarily used as the reference. That is, the amount of electric current to be supplied to the drive motor 20 may be used as the reference. In such a case, the operation is similar to that of the above-described case where the rotational speed of the drive motor 20 is used as the reference. Specifically, when the amount (current value) of electric current supplied to the drive motor 20 exceeds a threshold value (i.e., the point β in FIG. 2), the supply of the electric power to the drive motor 20 is stopped. In this way, similar to the above-described case where the rotational speed of the drive motor 20 is used as the reference, since the upper end portion (the tip end portion) of the window glass 11 contacts the glass run channel 12, the movement of the window glass 11 immediately stops. Thereby, the window glass 11 is placed into the state of FIG. 3C (i.e., the point γ in FIG. 2). At this time, there is no substantial positional change of the window glass 11 between the point β and the point γ in FIG. 2.

As described above, the occurrence of the change in the amount of load of the window glass 11 as well as the amount of load of the window glass 11 are monitored by sensing one of the rotational speed of the drive motor 20 and the amount (current value) of electric current supplied to the drive motor 20.

In the present embodiment, the drive motor 20 is controlled such that the upper end portion (more specifically a tip of the upper end portion) of the window glass 11 stops within a range of a thickness H of the glass run channel 12 installed to the stopper 14. Specifically, in the case where the window glass (the openable and closable member) 11, which is slightly tilted due to the looseness of the window glass 11, is driven in the closing direction and contacts the glass run channel 12 to place the window glass 11 into the full closing state, a part (hereinafter referred to as an initial contacting upper end part) of the window glass 11 at the upper end portion of the window glass 11 first contacts the glass run channel 12, and thereafter another part (hereinafter referred to as a subsequent contacting upper end part) of the window glass 11 at the upper end portion of the window glass 11 contacts the glass run channel 12. At that time, when the window glass 11 is driven further upward by the drive motor 20 in the slightly tilted state of the window glass 11, a portion of the glass run channel 12, which contacts the initial contacting upper end part of the window glass 11, is excessively deformed. When the drive motor 20 is driven further, the initial contacting upper end part of the window glass 11 and the glass run channel 12 may contact the stopper 14 to cause generation of an excess load to the drive motor 20. In contrast, according to the present embodiment, although the upper end portion (the tip end portion) of the window glass 11 contacts the glass run channel 12, the glass run channel 12 is not excessively compressed by the upper end portion of the window glass 11. Thus, even in the case of the window glass 11, which is slightly tilted due to the looseness of the window glass 11, it is possible to control the operation of the drive motor 20 such that the entire extent of the upper end portion of the window glass 11 contacts the glass run channel 12 to achieve the required sealing performance, and the window glass 11 is stopped before occurrence of the collision of the window glass 11 against the stopper 14, which causes generation of the impact against the stopper 14.

Next, a stop control operation will be described in detail with reference to FIGS. 2 to 6. FIG. 2 shows the graph that indicates the relationship between the rotational speed of the drive motor 20 and the amount of electric current supplied to the drive motor 20. FIGS. 3A, 3B and 3C show the relationship between the window glass 11 and the glass run channel 12 at the points α, β, γ, respectively, of FIG. 2. FIGS. 4A and 4B indicate the case where a threshold value of the rotational speed of the drive motor 20 is used. Specifically, FIG. 4A indicates the relationship between the rotational speed of the drive motor 20 and the position of the window glass (window glass position). FIG. 4B is the partial enlarged view of FIG. 4A. FIG. 5 is the flowchart of the stop control operation in a case where the stop control operation is canceled in a state where a voltage of the drive motor 20 is less than a predetermined voltage. FIG. 6 is the flowchart of the stop control operation in a case where a full closing determination value is increased.

First of all, with reference to FIG. 5, there will be described the stop control operation. In the stop control operation, in the case where the voltage of the drive motor 20 is smaller than the predetermined voltage, the stop control operation is canceled, and thereby the window glass 11 can be fully closed even in the low voltage condition where the closing force of the drive motor 20 for driving the window glass 11 is low.

In FIG. 5, when the up-switch of the power window apparatus is turned on (or the up-switch is kept turned on), the drive motor 20 is driven to move the window glass 11 upward. During this upward movement of the window glass 11, the rotational speed of the drive motor 20 is computed. The moving state and the moving distance of the window glass 11 are computed through the above-described computing process to monitor the position of the upper end portion of the window glass 11.

Specifically, the drive motor 20 is rotated in the normal rotational direction until the amount of load of the drive motor 20, which drives the window glass 11, changes. Furthermore, when the up-switch is turned off in the middle of the upward movement of the window glass 11, the microcomputer 50 outputs the stop signal to the drive circuit. Thereby, the drive circuit stops the supply of the electric power to the drive motor 20 and thereby stops the upward movement of the window glass 11.

The computation of the rotational speed of the drive motor 20, which is executed at step S1, is performed as follows. Specifically, the microcomputer 50 processes the pulse signal received from the load sensing device 40 and thereby senses the pulse edge. Every time the pulse edge is sensed, the microcomputer 50 computes a pulse width (time interval) T between the previously sensed pulse edge and the currently sensed pulse edge and sequentially stores the computed pulse width T in the memory. In the present embodiment, the pulse width T is sequentially renewed every time the new pulse edge is sensed, so that the latest four pulse widths T(0) to T(3) are stored in the memory. Specifically, when the new pulse edge is sensed, the new pulse width T(0) is computed, and the previous pulse widths T(0) to T(2) are sequentially shifted in the memory, so that the new pulse width T(0) and the previous pulse widths T(0) to T(2) are stored as the current pulse widths T(1) to T(3), respectively, in the memory, and the previous pulse width T(3) is erased from the memory.

The microcomputer 50 computes the rotational speed ω from a reciprocal of a sum (a pulse period P) of the pulse widths T of a predetermined number n of continuous pulse edges. This rotational speed ω is a proportional value, which is proportional to the actual rotational speed of the drive motor 20. In the present embodiment, the average rotational speed ω(0) is computed based on the pulse widths T(0) to T(3), which are obtained based on the current pulse edge and four previous pulse edges.

Then, when the next pulse edge is sensed, the rotational speed ω(0) is renewed based on the newly computed pulse widths T(0) to T(3). At this time, the previous rotational speed ω(0) is stored in the memory as a rotational speed ω(1). In the above-described manner, the microcomputer 50 always stores the latest eight rotational speeds ω(0) to ω(7), which are renewed every time the pulse edge is sensed (every predetermined moving amount or every predetermined rotational angle). When the rotational speed ω is computed based on the multiple pulse widths T, it is possible to substantially eliminate a variation in the pulse width T of each received pulse signal output, and thereby it is possible to compute the rotational speed, from which the erroneous changes are substantially eliminated.

Also, at step S1, the microcomputer 50 computes the (average) rotational speed difference (the rotational speed change rate) Δω based on the rotational speed ω. Specifically, the latest four rotational speeds ω(0) to ω(3) are named as current block data and are summed to obtain a sum of the current block data, and the older four rotational speeds ω(4) to ω(7) are named as previous block data and are summed to obtain a sum of the previous block data. Then, the sum of the current block data is subtracted from the sum of the previous block data. That is, the rotational speed difference Δω is computed by subtracting the sum of the rotational speeds ω(0) to ω(3) from the sum of the rotational speeds ω(4) to ω(7) and is updated every time the pulse edge is sensed (at every predetermined moving amount or at every predetermined rotational angle). Here, alternatively, instead of using the sum of the rotational speeds, the computed value (the sum of the rotational speeds) may be divided by the number of the computed rotational speeds in each block data. By computing the rotational speed difference Δω based on the multiple rotational speeds ω, phase differences among the rotational speeds ω can be canceled.

At next step (serving as a position determining step) S2, the microcomputer 50 determines whether it is the time to start the full closing control operation by determining whether the window glass 11 is moved to a predetermined position. This determination is made based on the pulse signals outputted from the Hall IC (at least one of the Hall elements) of the load sensing device 40. Specifically, when the pulse count value, which is incremented every time the pulse edge of the pulse signal is sensed, reaches a predetermined value, the microcomputer 50 determines that the window glass 11 reaches the predetermined position.

When it is determined that the window glass 11 is not moved to the predetermined position at step S2 (step S2: NO), the operation is terminated and returns to the beginning (step S1).

In contrast, when it is determined that the window glass 11 is moved to the predetermined position at step S2 (step S2: YES), the operation proceeds to step (serving as a voltage sensing step) S3 where a voltage determining process is executed. Specifically, at step S3, the microcomputer 50 determines whether the amount of voltage (a voltage value) of the drive motor 20 is equal to or larger than a predetermined voltage (a specified value) V. The predetermined voltage V refers to a voltage that enables continuous rotation of the drive motor 20 to upwardly move the upper end of the window glass 11 in the closing direction without stopping the rotation of the drive motor 20. The predetermined voltage may vary depending on a size and a type of the drive motor 20. For example, in the case of the drive motor of the power window apparatus, the predetermined voltage is set to be 10 volt.

When it is determined that the voltage of the drive motor 20 is not equal to or larger than the predetermined voltage (step S3: NO), the operation is terminated and returns to the beginning (step S1). In this way, the supply of the electric power to the drive motor 20, which drives the window glass 11, is not interrupted (i.e., without causing the stop of the rotation of the drive motor 20), and thereby the drive motor 20 is continuously rotated in the normal rotational direction, and the window glass 11 can be fully closed even when the voltage of the drive motor 20 is low.

In contrast, when it is determined that the voltage of the drive motor 20 is equal to or larger than the predetermined voltage V at step S3 (step S3: YES), the operation proceeds to step (serving as a part of a load change sensing step) S4 where a load change start determination process is executed. The load change start determination process determines whether a change in the amount of load applied to the drive motor 20 is started. This change (load change) is a predetermined change in the amount of load caused by contact of the window glass 11 to the glass run channel 12.

The load change start determination process of step S4 is executed based on the rotational speed of the drive motor 20 or the amount (current value) of electric current of the drive motor 20. In the case where the load change start determination process of step S4 is executed based on the rotational speed of the drive motor 20, the microcomputer 50 subtracts the current rotational speed ω of the drive motor 20 from the previous rotational speed ω of the drive motor 20 in the manner discussed with reference to step S1 to obtain the current rotational speed difference Δω. Then, the microcomputer 50 determines whether the rotational speed difference Δω exceeds a threshold value. In this instance, a value of the rotational speed difference Δω is a negative value since the rotational speed of the drive motor 20 is reduced. Thus, in this instance, microcomputer 50 determines whether the value of the rotational speed difference Δω exceeds below the threshold value. When the rotational speed difference Δω exceeds the threshold value, it is determined that the change in the amount of load (the load change) is started at step S4 (step S4: YES). In contrast, when the rotational speed difference Δω does not exceed the threshold value, it is determined that the change in the amount of load (the load change) is not started at step S4 (step S4: NO).

When it is determined that the change in the amount of load is started at step S4 (step S4: YES), the operation proceeds to step (serving as another part of the load change sensing step) S5 where a load change amount computing process, which computes the amount of change in the load, is executed.

In contrast, when it is determined that the change in the amount of load is not started at step S4 (step S4: NO), the operation returns to step S3.

Furthermore, in the case where it is determined that the change in the amount of load is started at step S4 (step S4: YES), the amount of change in the load is computed at step S5. The amount of change in the load is computed by cumulating the rotational speed differences $\Delta\omega$. The cumulating of the rotational speed differences $\Delta\omega$ starts when the change in the amount of load is started (step S4: YES). Specifically, a new rotational speed difference $\Delta\omega$, which is newly computed, is added to a previous rotational speed difference $\Delta\omega$, which is previously computed immediately before the computation of the new rotational speed difference $\Delta\omega$, to obtain a cumulative value $\Sigma\Delta\omega$ of the rotational speed differences $\Delta\omega$ (also referred to as a rotational speed change amount) after it is determined that the change in the amount of load is started (step S4: YES). Thereafter, every time a new rotational speed difference $\Delta\omega$ is computed, the new rotational speed difference $\Delta\omega$ is added to the current cumulative value $\Sigma\Delta\omega$ of the rotational speed differences $\Delta\omega$ to obtain the cumulative value $\Sigma\Delta\omega$ of the rotational speed differences $\Delta\omega$ (the rotational speed change amount S), which has been cumulated since the time of starting the change in the amount of load.

Then, a full closing state determining process is executed at step (serving as a load attainment determining step) S6 after the computation of the rotational speed change amount S at step S5. The full closing state determining process is a process of determining whether the rotational speed change amount S, i.e., the total cumulative value $\Sigma\Delta\omega$ of the rotational speed differences $\Delta\omega$, which has been cumulated since the time of starting the change in the amount of load, exceeds a predetermined reference value (predetermined threshold value). This predetermined reference value (also referred to as a full closing determination value) is a variable reference value, which is corrected or adjusted based on a reference value stored in the ROM in view of, for example, the load change. The full closing state determining process is executed based on this predetermined reference value. When it is determined that the rotational speed change amount S does not exceed the predetermined reference value, it is determined that the window glass 11 is not placed into the full closing state of the window glass 11 at step S6 (step S6: NO). Then, the operation returns to step S3.

In contrast, when it is determined that the rotational speed change amount S exceeds the predetermined reference value, it is determined that the window glass 11 is placed into the full closing state of the window glass 11 at step S6 (step S6: YES). Then, the operation proceeds to step (serving as an electric power supply stopping step) S7 where a stopping process, which stops the rotation of the drive motor 20, is executed. In the stopping process of the drive motor 20, the microcomputer 50 outputs a signal to the drive circuit 60 to control the supply of the electric power to the drive motor 20, so that the rotation of the drive motor 20 is stopped to stop the upward movement of the window glass 11. As discussed above, the change in the amount of load is sensed based on the change in the rotational speed of the drive motor 20 (or the change in the amount of electric current of the drive motor 20), so that the drive motor 20 can be stopped before generation of a locked-rotor current, which is an electric current conducted in the drive motor 20 at the time of locking the rotor of the drive motor 20.

Therefore, the window glass (the openable and closable member) 11 can be reliably stopped immediately before the time of squeezing the glass run channel 12 with the window glass 11. In this way, the drive motor 20 is stopped to stop the window glass 11 before the time of reaching the mechanical limit position, at which the glass run channel 12 is squeezed with the window glass 11, as indicated in FIG. 3C.

Furthermore, the movement of the window glass 11 is stopped before the time of reaching the mechanical limit position of the window glass 11, at which the glass run channel 12 is squeezed with the window glass 11, so that unlike the previously proposed technique discussed above, the window glass 11 is not pushed further upward to cause the movement of the window glass in the widthwise direction of the vehicle. Furthermore, the influence of the movement of the window glass 11 is eliminated, so that the influence on the inner seal lip portion and the outer seal lip portion of the belt molding is eliminated. Thereby, the normal positional relationship between the belt molding, which is placed at the lower frame portion of the window frame 13, and the window glass 11 can be maintained. As a result, the generation of the wind noise can be limited at the time of running the vehicle. FIGS. 4A and 4B indicate the exemplary case where the rotational speed $\omega$ of the drive motor 20 is decreased, and the point of the rotational speed (the rotational speed difference $\Delta\omega$), which serves as the threshold value used at step S4, is located between a contact point, at which the window glass 11 begins to contact the glass run channel 12, and a locking stop point, which is the mechanical moving limit position of the window glass 11, to serve as the reference.

As discussed above, according to the present embodiment, it is determined whether the amount of change in the rotational speed $\omega$ (the rotational speed change amount S) exceeds the threshold value at step S6. When it is determined that the amount of change in the rotational speed $\omega$ exceeds the threshold value, the stopping process of the drive motor 20 is immediately executed at step S7.

In the present embodiment, the amount of load applied to the window glass 11 (the rotational speed or the amount of electric current applied to the drive motor 20) is sensed. When the amount of load is increased and exceeds the predetermined threshold value, the supply of the electric power to the drive motor 20 is stopped immediately before the locking stop point. That is, the control operation of the present embodiment is executed when the window glass 11 reaches the point around the full closing position of the window glass 11 at the window (opening) 13a of the window frame 13. As a result, the disadvantageous influence, which is caused by the erroneous stop of the window glass 11, can be limited. Also, the control operation of the present embodiment is executed immediately before the mechanical moving limit position of the window glass 11 to stop the drive device (the drive means) based on the change in the amount of load. Thus, it is possible to limit the deterioration of the sealing performance.

Next, with reference to FIG. 6, there will be described another control operation (a modification of the control operation of FIG. 5), which corrects the full closing determination value (the threshold value) unlike the control operation of FIG. 5, in which execution of step S6 is canceled in the case where the voltage is determined to be lower than the predetermined voltage V at step S3. In the control operation of FIG. 6, the correction of the full closing determination value (the threshold value) is made by increasing the full closing determination value (i.e., to change a predetermined value of the load, i.e., the predetermined amount of load) to avoid execution of erroneous stopping of the drive motor 20. In FIG. 6, the processes, which are other than those of steps S13 and S17, are the same as those of FIG. 5 and thereby will not be described redundantly. Specifically, steps S11, S12, S14, S15, S17, S18 of FIG. 6 are the same as steps S1, S2, S4, S5, S6, S7, respectively, of FIG. 5.

When it is determined that the window glass 11 is moved upward to the predetermined position at step S12 (step S12: YES), the operation proceeds to step S13 where the voltage determining process for determining the voltage of the drive motor 20 is executed. Specifically, at step S13, the microcomputer 50 determines whether the amount of voltage (voltage value) of the drive motor 20 is equal to or larger than the predetermined voltage V. The predetermined voltage V refers to the voltage that enables continuous rotation of the drive motor 20 to upwardly move the upper end of the window glass 11 in the closing direction without stopping the rotation of the drive motor 20. The predetermined voltage V may vary depending on the size and the type of the drive motor 20. For example, in the case of the drive motor of the power window apparatus, the predetermined voltage is set to be 10 volt.

When it is determined that the amount of voltage (voltage value) of the drive motor 20 is not equal to or larger than the predetermined voltage V at step S13 (step S13: NO), the operation proceeds to step S16. At step S16, a threshold value correcting process, which corrects the threshold value used as the full closing determination value, is executed. Specifically, this correction is made by increasing the predetermined value, which is preset for the time of occurring of the change in the amount of load. In this way, it is determined that the window glass 11 is not fully closed at step S17 (step S17: NO), and thereby the execution of the stopping process for stopping the drive motor 20 at step S18 can be avoided.

As discussed above, at step S17, it is determined whether the amount of change in the rotational speed (the rotational speed change amount S) exceeds the predetermined value (the threshold value), which is preset for the time of occurring of the change in the amount of load. This predetermined value is the new reference value, which is obtained by correcting the above-described reference value stored in the ROM in view of the change in the amount of load. The full closing state determining process is executed based on this predetermined reference value. This predetermined reference value, which is used at step S17, is a corrected value that is increased to change the predetermined value of the load (the predetermined amount of load).

In this way, the supply of the electric power to the drive motor 20, which drives the window glass 11, is not interrupted (i.e., without causing the stop of the rotation of the drive motor 20), and thereby the drive motor 20 is continuously rotated in the normal rotational direction, and the window glass 11 can be fully closed even when the voltage of the drive motor 20 is low.

Furthermore, in the above embodiment, the openable and closable member control apparatus and the openable and closable member control method are described in view of the exemplary case of the power window apparatus of the vehicle. However, it should be noted that the openable and closable member of the openable and closable member control apparatus is not limited to the window glass. That is, the openable and closable member control apparatus and the openable and closable member control method of the present disclosure can be applied to other apparatuses, such as a sunroof opening and closing apparatus, which opens and closes a roof panel (openable and closable member) of a sun roof, or a slide door opening and closing apparatus, which opens and closes a slide door (openable and closable member) of a slide door apparatus.

Furthermore, in the above embodiment, the cumulating of the rotational speed differences $\Delta\omega$ starts at the time of starting the change in the amount of load (from the time of obtaining YES at step S4 of FIG. 5 or step S14 of FIG. 6) to obtain the cumulative value $\Sigma\Delta\omega$. Alternatively, the cumulating of the rotational speed differences $\Delta\omega$ may start at the time of reaching of the window glass 11 to the predetermined position, which is sensed at step S2 of FIG. 5 or step S12 of FIG. 6. Further alternatively, the cumulating of the rotational speed differences $\Delta\omega$ may start at any time point while the drive motor 20 is rotated at a constant rotational speed after the turning on of the up-switch of the power window apparatus. Further alternatively, the cumulating of the rotational speed differences $\Delta\omega$ may start after the time of starting the change in the amount of load (after the time of obtaining YES at step S4 of FIG. 5 or step S14 of FIG. 6). In these cases, the predetermined reference value (the predetermined threshold value) used in the full closing state determining process at step S6 of FIG. 5 or step S17 of FIG. 6 should be adjusted to a corresponding value to reflect this change.

What is claimed is:

1. An openable and closable member control apparatus comprising:
   a drive device that drives an openable and closable member to open or close an opening of a subject with the openable and closable member; and
   a controller that controls the drive device and is configured to execute:
   a position determining step of determining whether the openable and closable member reaches a predetermined start position, the predetermined start position corresponding to a position of the openable and closable member between a fully open position and a fully closed position at which the controller starts a full closing control operation of the drive device to place the openable and closable member into a full closing state;
   a voltage sensing step of sensing an amount of voltage of the drive device; and
   a voltage comparison step of comparing the amount of voltage of the drive device with a predetermined voltage;
   wherein when the amount of the voltage of the drive device is less than the predetermined voltage, the controller is configured to maintain a supply of electric power to the drive device; and
   wherein when the amount of the voltage of the drive device is greater than or equal to the predetermined voltage, the controller is configured to execute:
      a load change sensing step of sensing an amount of load that is generated by contact between a seal member of the opening and the openable and closable member after reaching of the openable and closable member to the start position;
      a load attainment determining step of determining whether the amount of load reaches a predetermined value that is set to a value to be attained before reaching of the openable and closable member to a mechanical limit position; and
      an electric power supply stopping step of stopping the supply of electric power to the drive device after it is determined that the amount of load reaches the predetermined value in the load attainment determining step.

2. The openable and closable member control apparatus according to claim 1, wherein the drive device is a drive motor and wherein the specified value corresponds to a predetermined voltage that enables continuous rotation of the drive motor to upwardly move the openable and closable member towards the full closing state without stopping rotation of the drive motor.

3. The openable and closable member control apparatus according to claim 1, wherein when the amount of the voltage of the drive device is less than the predetermined voltage, the controller is configured to maintain the supply of electric power to the drive device while prohibiting execution of the load attainment determining step.

4. An openable and closable member control method for controlling a drive device, which drives an openable and closable member to open or close an opening of a subject with the openable and closable member, the openable and closable member control method comprising:
   a position determining step of determining whether the openable and closable member reaches a predetermined start position, the predetermined start position corresponding to a position of the openable and closable member between a fully open position and a fully closed position at which a full closing control operation of the drive device is started to place the openable and closable member into a full closing state;
   a voltage sensing step of sensing an amount of voltage of the drive device;
   a voltage comparison step of comparing the amount of voltage of the drive device with a predetermined voltage;
   in response to the amount of the voltage of the drive device being less than the predetermined voltage, maintaining a supply of electric power to the drive device; and
   in response to the amount of the voltage of the drive device being greater than or equal to the predetermined voltage, performing:
      (i) a load change sensing step of sensing an amount of load that is generated by contact between a seal member of the opening and the openable and closable member after reaching of the openable and closable member to the start position;
      (ii) a load attainment determining step of determining whether the amount of load reaches a predetermined value that is set to a value to be attained before reaching of the openable and closable member to a mechanical limit position;
      (iii) an electric power supply stopping step of stopping the supply of electric power to the drive device after it is determined that the amount of load reaches the predetermined value in the load attainment determining step.

5. The openable and closable member control method according to claim 4, wherein the drive device is a drive motor and wherein the specified value corresponds to a predetermined voltage that enables continuous rotation of the drive motor to upwardly move the openable and closable member towards the full closing state without stopping rotation of the drive motor.

6. The openable and closable member control method according to claim 4, wherein the maintaining of the supply of electric power to the drive device is executed in response to the amount of the voltage of the drive device being less than the predetermined voltage while prohibiting execution of the load attainment determining step.

7. An openable and closable member control apparatus comprising:
   a drive device that drives an openable and closable member to open or close an opening of a subject with the openable and closable member;
   a load sensing device that outputs a pulse signal synchronized with a rotation of the drive device;
   a controller in communication with the load sensing device, the controller being configured to: control the drive device; determine whether the openable and closable member has reached a predetermined start position while the openable and closable member is being closed, the predetermined start position being between a fully open position and a fully closed position; automatically start a full closing control operation of the drive device to place the openable and closable member into a full closing state when the openable and closable member has reached the predetermined start position while the openable and closable member is being closed; sense an amount of voltage of the drive device; and compare the amount of voltage of the drive device with a predetermined voltage;
   wherein when the amount of voltage of the drive device is less than the predetermined voltage, the controller is configured to maintain a supply of electric power to the drive device; and
   wherein when the amount of voltage of the drive device is greater than or equal to the predetermined voltage, the controller is configured to: determine an amount of load on the drive device generated by contact between a seal member of the opening and the openable and closable member based on the pulse signal received from the load sensing device; determine whether the amount of load reaches a predetermined load value, the predetermined load value corresponding to a load value attained before the openable and closable member reaches a mechanical limit position; and stop the supply of electric power to the drive device in response to determining that the amount of load has reached the predetermined load value.

8. The openable and closable member control apparatus according to claim 7, wherein when the amount of the voltage of the drive device is less than the predetermined voltage, the controller is configured to maintain the supply of electric power to the drive device while prohibiting execution of the determining of whether the amount of load reaches the predetermined load value.

* * * * *